3,449,567
APPARATUS AND PROCESS FOR DETERMINING PARTICLE SIZE BY X-RAY ABSORPTION ANALYSIS

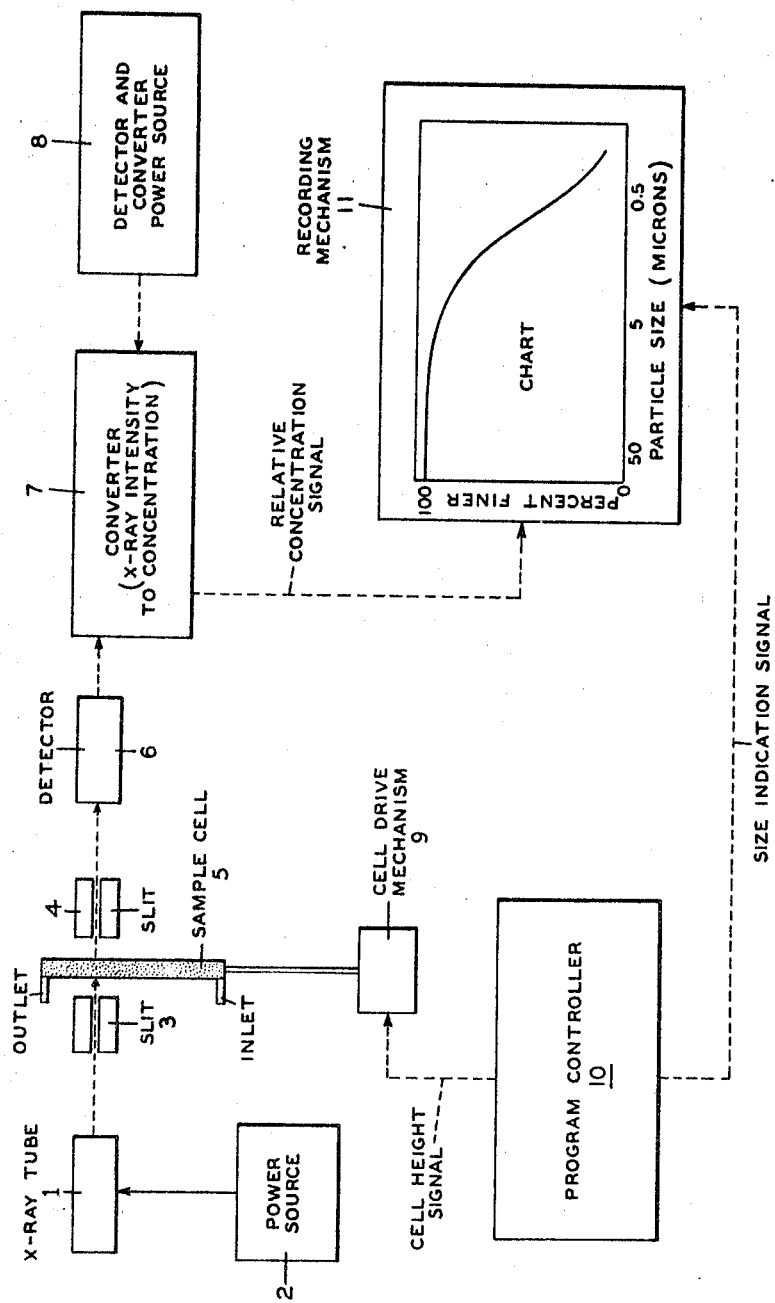

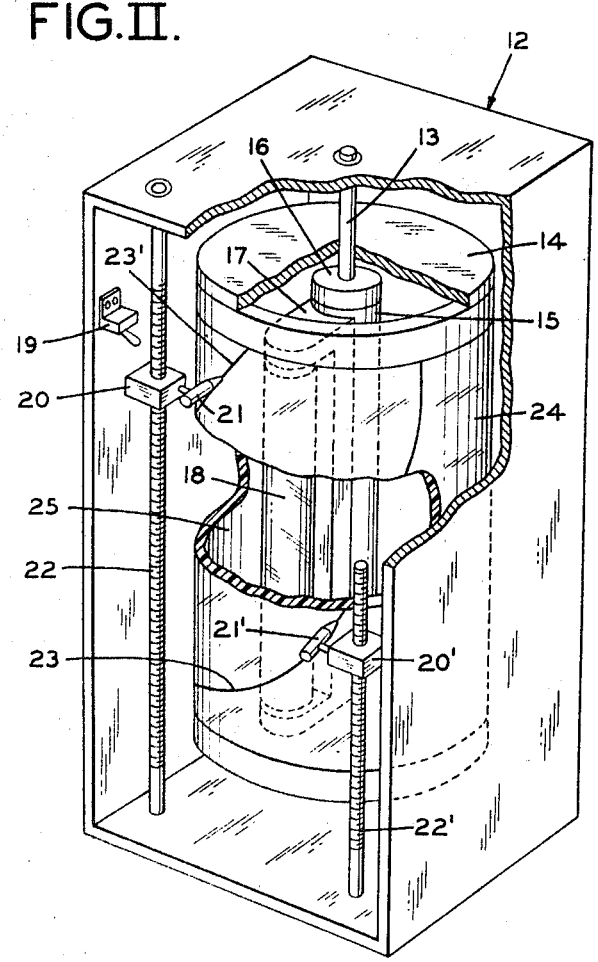
FIG. II.

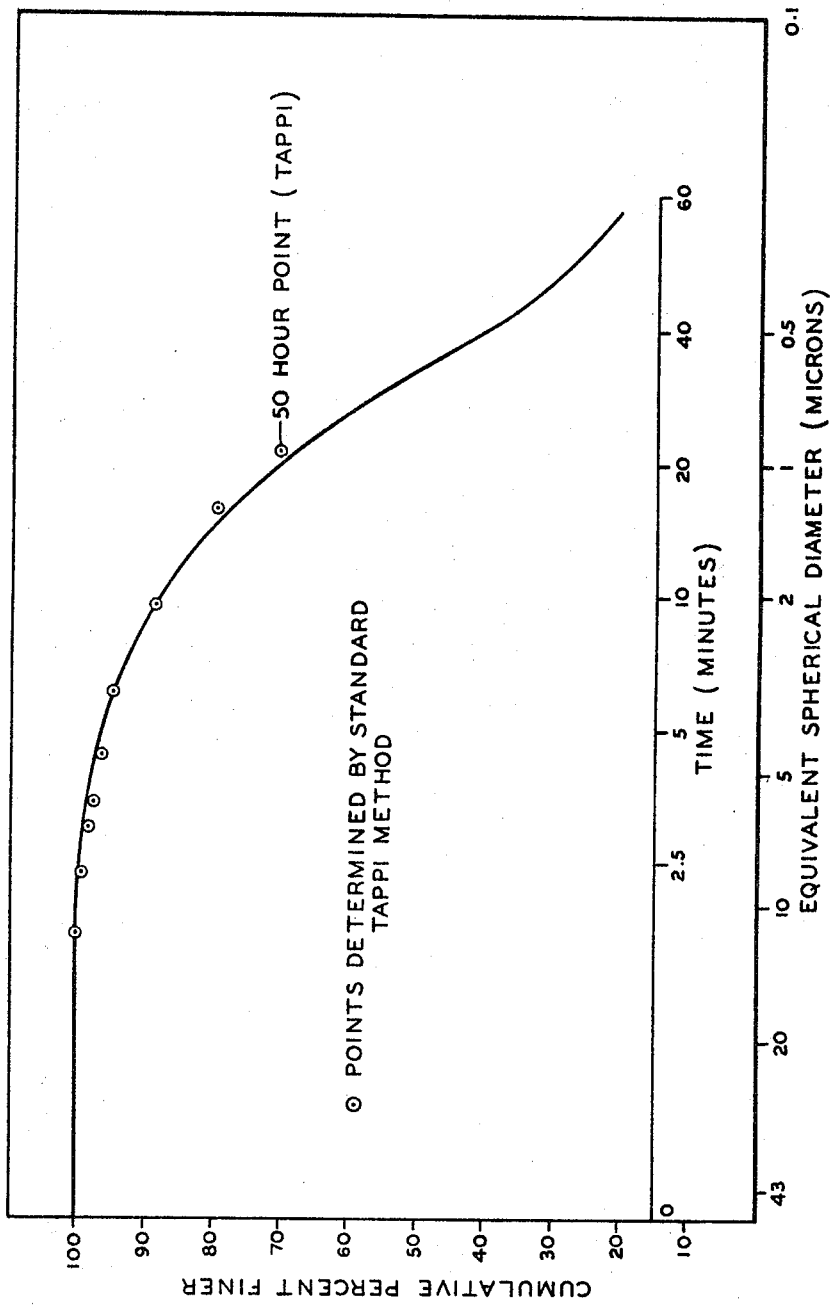

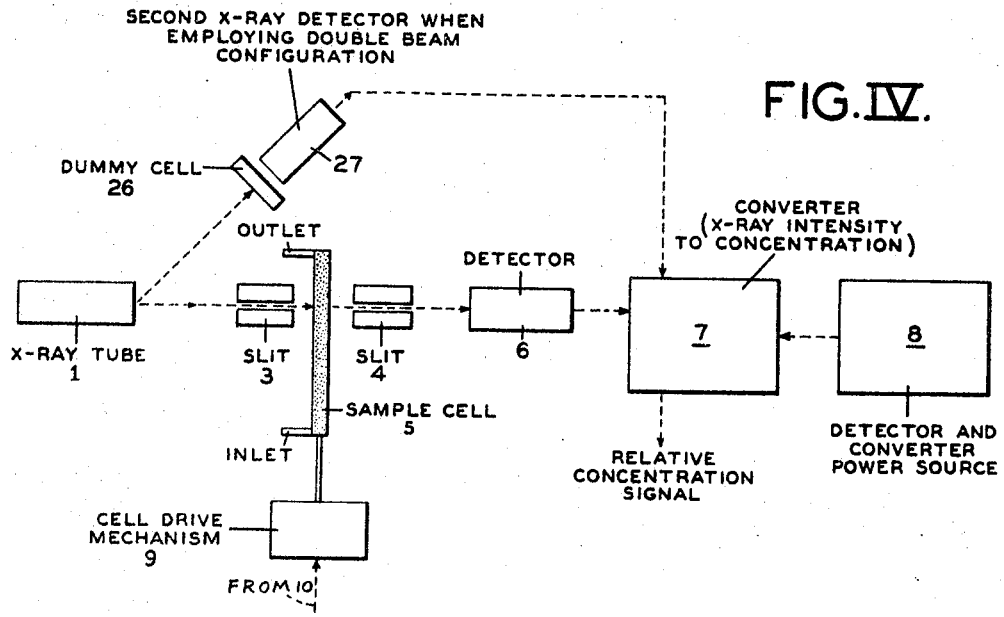
FIG. IV.
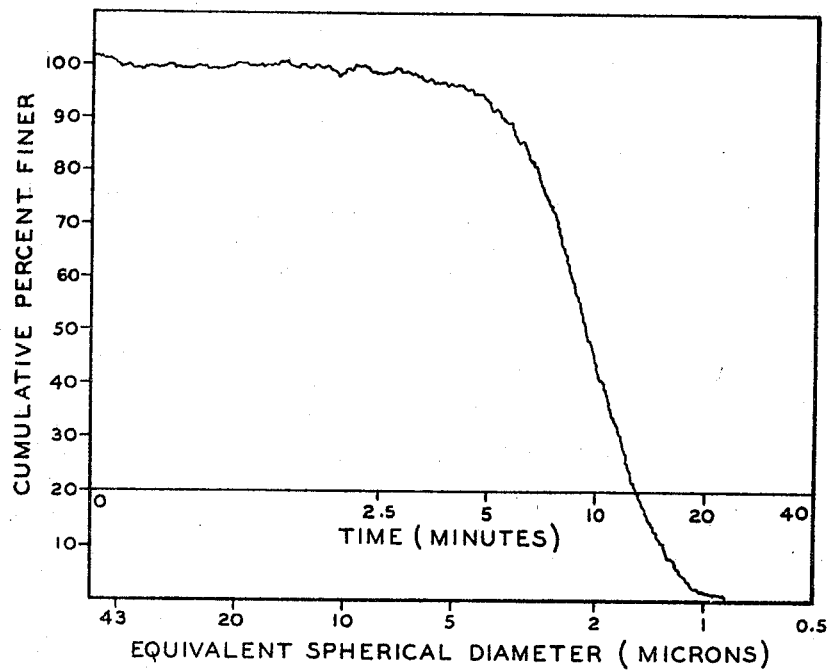
FIG. V.
PARTICLE SIZE DISTRIBUTION

James Peter Olivier and George K. Hickin, Macon, Ga., assignors to Freeport Sulphur Company, New York, N.Y., a corporation of Delaware
Filed Jan. 23, 1967, Ser. No. 610,841
Int. Cl. G01n 23/12
U.S. Cl. 250—43.5                                   5 Claims

ABSTRACT OF THE DISCLOSURE

An apparatus and process for measuring and automatically recording the particle size distribution of material in suspension, which is based on the application of Stokes' Law of sedimentation. A beam of X-rays is used to measure particle concentration in terms of the transmittance of the beam in the suspension relative to the suspending fluid. A programmed drive mechanism causes the distance between the point of intersection of the X-ray beam with the suspension and upper or lower surface of the suspension to be continuously changed with time.

Background of the invention

The present invention relates to a particle size analyzer. It also concerns a unique process for automatically measuring the particle size distribution of a dispersion of finely divided material.

The processes for fine particle size measurement that are in the literature can be broken down into two main headings: (1) methods yielding average particle size only, which is of limited interest, since a particulate material can rarely be fully characterized in terms of its average particle size; and (2) methods yielding size distribution.

Methods yielding particle size distribution have been extensively treated in the literature. They are represented by the following five techniques: sieving; direct optical or electron microscopic counting and measuring; electronic counting and sizing; elutriation; and sedimentation. Most of these techniques have limited use. Thus the sieving technique is not readily applicable for measurement of particles finer than 50 microns; it requires a sizeable sample, much time and many manual operations; it also gives questionable results for anisometric particles. A serious disadvantage of the optical technique lies in the fact that the transmission of light through a suspension of fine particles is dependent on the size and color of the particles as well as their concentration; it further requires a lengthy mathematical reduction of the primary data.

The direction microscopic technique is tedious because of the statistical requirements for counting and measuring huge numbers of particles; it further requires lengthy mathematical analysis of the results. The electronic technique is complex and expensive and also difficult to employ with fine particle material having a wide particle size distribution; it also requires a rather lengthy and tedious mathematical reduction of the primary data to obtain the final particle size distribution. Particle size analysis by elutriation is very difficult to control experimentally.

Today, the sedimentation rate technique forms the basis of most of the practical methods of particle size measurements. This technique is dependent on the fact that the rate of fall of a particle through a viscous medium is directly related to the size of the particle by Stokes' Law. Stokes' Law for spherical particles is expressed as $$D = K v^{1/2} \qquad (1)$$

where $D$ is the diameter of a falling sphere and $v$ is its equilibrium rate of fall (velocity). $K$ is a constant depending on the density $\rho$ (rho) of the sphere, and on the density $\rho_0$ (rho$_0$) and viscosity $\eta$ (eta) of the viscous medium, $K$ being equal to $$K = \left( \frac{18\eta}{(\rho - \rho_0)g} \right)^{1/2} \qquad (2)$$

where $g$ is the gravitational acceleration.

In practice, truly spherical particles are uncommon, and it is recognized that Stokes' Law is not exact for any other shape; however, the deviations are small in most cases. Since irregular shapes cannot in any case be described by a single linear dimension, it is an accepted practice to specify the size of irregular or non-spherical particles in terms of the diameter of a sphere of the same material that would have the same sedimentation velocity. This diameter is commonly referred to as "Stokes' diameter" or "Equivalent Spherical Diameter."

In general in sedimentation analysis a dilute (less than 10% solids) deflocculated suspension of a fine particle material is stirred to render it homogeneous. It is then allowed to stand tranquilly while undergoing sedimentation. Time is measured from the beginning of the settling period. By Stokes' Law, a particle of diameter $D$ will settle a distance $h$ in time $t$ according to the expression $$D = K \left( \frac{h}{t} \right)^{1/2} \qquad (3)$$

where $K$ is as in Equation 2 supra. Consequently, after a given time $t_1$ all particles larger than the corresponding value $D_i$ will have fallen below a distance $h$ from the surface of the suspension. If the initial concentration of particles is $C_0$ g./ml. and the concentration after time $t_1$ at distance $h$ is $C_i$ g./ml., then the percent of particles $P_i$, by weight of sample finer than $D_i$ is $$P_i = 100 \frac{C_i}{C_0} \qquad (4)$$

Various methods for determining particle size distribution by sedimentation employ the above relationships, but differ in the specific technique used to determine $C_i$ as a function of time at a known $h$. Thus in the Andreasen Pipette method, a small sample of suspension is periodically withdrawn by means of a pipette from depth $h$, and the concentration of solid determined. In certain ASTM and TAPPI methods, e.g., TAPPI, T649 s.m. 54 and ASTM D422–61T, a hydrometer is periodically inserted into the suspension and the concentration remaining at the bulb depth, $h$, is determined from the specific gravity registered.

The above procedures suffer from several serious faults. For example, these procedures do not measure concentration at a specific value of $h$, but rather over a considerable range around some mean value of $h$. This has an averaging effect that "smears out" any detail in any distribution curve. Furthermore, repeated removal of samples, or insertion of the hydrometer, during a size determination can seriously disturb the sedimentation equilibrium, causing erorrs and lack of reproducibility. Moreover, in the above procedures, the distance $h$ below the surface at which concentration is measured is commonly of the order of 15–25 cm. Since a one-micron particle of density 2.5 g./cm.$^3$ settles in water at a rate of about 1/3 cm./hour, about 50 hours is required to determine the size distribution down to one-micron size.

Summary

The particle size analyzer and method of our invention have the advantages of automatically and directly recording an accurate particle size distribution curve with no need for calculation or continued operator attention. In our analyzer a beam of X-rays is used to measure particle concentration in terms of the transmittance of the beam through suspension relative to the suspending fluid, e.g., water. While the transmission of visible light through a dilute suspension is a complex function of concentration, color, particle size, shape and refractive index, the transmission of X-ray wavelengths is a function only of the weight concentration of suspended solids. The advantage of the X-ray beam is that it can be made extremely small. It also does not disturb the suspension.

The relation between the fraction of X-rays transmitted and the concentration of solid is given by $$\ln T = -\Delta \mu L C \quad (5)$$

where ln T is the natural log of the transmittance relative to water, $\Delta \mu$ (mu) is the difference in the X-ray mass absorption coefficients of solid and water, L is the sample cell thickness and C is the concentration of particles in suspension. The "percent finer" than size $D_i$ is given by $$P_i = 100 \frac{\ln T_i}{\ln T_o} \quad (6)$$

where $T_i$ is the transmittance after a given time $t_i$ at a distance $h_i$ and $T_o$ is the transmittance at the initial starting time $t_o$.

The various aspects and modifications of the present invention will be made more clearly apparent by reference to the accompanying drawings and description.

Brief description of the drawing

FIGURE I is a schematic view of our particle size analyzer.

FIGURE II is a schematic view of a program controller element of our patricle size analyzer.

FIGURE III shows the particle size distribution of an aqueous suspension of kaolin clay as determined by a standard TAPPI procedure and as determined with our analyzer.

FIGURE IV shows another embodiment of our analyzer.

FIGURE V shows the particle size distribution of an aqueous suspension of a narrow size distribution kaolin clay fraction.

Referring to FIGURE I, X-ray tube 1 has a high voltage power source 2. Horizontal slits are at 3 and 4. A sample cell with walls transparent to X-rays, e.g., Lucite walls, is at 5 and X-ray detector is at 6. The sample cell 5 normally has horizontal dimensions of about 1/2" by 1/8" and is about 2" in height although its dimensions are not critical. The X-ray detector 6 may be a scintillation counter, proportional counter or a Geiger counter coupled with conventional electronic circuitry.

Analog converter 7, e.g., a conventional logarithmic transconductor as manufactured by Philbrick Researches Inc., receives the signal from the X-ray detector. Detector power source and analog converter power source are at 8. A sample cell drive mechanism is at 9 and program controller is at 10. An abscissa and ordinate recording mechanism, e.g., an "x–y" Servo recorder such as is manufactured by Leeds & Northrup, is at 11.

Referring to exemplary program controller in FIGURE II, support framework 12 has positioned in it a rotatable drum shaft 13 and drum top plate 14. Nonrotatable support shaft is at 15 while a rotatable bearing is at 16. Fluorescent lamp bracket 17 is secured to support shaft 15. A fluorescent lamp is at 18. A limit switch is at 19 and a lead screw nut is at 20. In operation, switch 19 can stop upward travel of nut 20 during reset operation (another limit switch is on the opposite side). Lead screw nuts 20 and 20' hold respectively photo conductive cells 21 and 21'. These cells follow curves 23 and 23' on transparent chart 24. Lead screws are at 22 and 22' (the left hand screw controls record chart position vs. time while the right hand screw controls sample cell positions vs. time). Rate curves 23 and 23' establish position-time relationship for chart in recorder 11 and sample cell 5. Rate curves 23 and 23' are drawn on transparent chart 24, the curves with chart 24 being wrapped around and secured to transparent plastic drum 25.

Description of the preferred embodiments

In operation, and referring to FIGURES I and II, the main power is turned on at the control console (not shown in the drawing) to activate the electronic circuits. The radiation from X-ray tube 1 with its associated power supply 2 is collimated by horizontal slits 3 to a beam about 0.001" in height by about 3/8" wide; this beam passes through a sample cell 5, which is about 1/2" in width and about 1/8" in internal thickness, holding a dilute aqueous suspension of material to be analyzed. X-ray detector 6 then measures the transmitted radiation, the beam having passed through slits 4. Then following suitable logarithmic conversion via converter 7 a signal is registered on one axis of x–y recorder 11 as relative concentration (pure water=0%, initial suspension=100%).

Sample cell 5 is driven downward via drive mechanism 9 relative to the X-ray beam, thus decreasing $h$. This motion is controlled as a function of time from the start of the run by program controller 10, that simultaneously positions the y axis of the recorder 11 to directly indicate the particle size, $D_i$, corresponding, through Stokes' Law, to the instantaneous values of $h_i$ and $t_i$.

Drum 25, carrying the rate curves 23 and 23', is started in rotation at a constant rate by a motor (not shown) in a counterclockwise direction from its initial position. This moves the opaque rate curves 23 and 23' drawn on the transparent chart 24 out from under those photo conductive cells 21 and 21', causing them to receive illumination from the fluorescent light 18. Whenever illuminated, a photo cell activates a motor (not shown) coupled to the photo cell's lead screw, that in turn lowers the photo cell by means of the lead screw nut until the cell is again obscured by the opaque rate curve, which shuts off the motor. In this way, the photo cells move in small steps so as to always intersect the top edge of the opaque curves. The photo cells 21 and 21' thus control independently the rotation of lead screws 22 and 22', one of said lead screws being coupled to the pen of "x–y" recorder 11 so as to position it properly, and the other lead screw mechanically coupled to the cell height adjusting mechanism 9. The rate curves 23 and 23' are mathematically calculated so as to provide a correct solution to Stokes' Law at any instant in terms of the elapsed time and cell position.

In more detail, the operation of this embodiment is as follows: The main power can be turned on at a control console (not shown on drawing) to activate the electronic circuits, and pure water caused to flow through the sample cell 5 by means of a small pump (not shown). Fresh chart paper is placed on the recorder 11 and the recording pen brought to the zero percent line by means of the recorder zero control. A deflocculated suspension of sample to be analyzed at about 5% solids, is then pumped to the cell 5 and the recorder pen brought to the 100% line with the recorder sensitivity control. The recorder pen is also made to coincide with the preprogrammed initial maximum particle size to be measured (usually 50 microns) on the chart paper. To start the determination, the control button (not shown) marked "START" is pressed. This activates a solenoid (not shown) that shuts off the sample flow to the cell 5. After a preset time delay corresponding to the time required for 50 micron particles to fall an initial height $h$ in the sample cell, the Program Control (curve follower assembly) starts to decrease the sedimentation depth and simultaneously displaces the recorder chart size indication so as to satisfy Stokes' Law at every instant. Unless the "STOP" button (not shown) is pressed sooner, the apparatus will continue running for 100 minutes, at which time the recorder 11 will be registering percent finer than 0.2 micron. At this time the analyzer stops and a light (not shown) marked "END" is turned on. To ready the analyzer for another determination, the "RESET" button (not shown) is pressed, which restores the cell and recorder to their initial position and flushes the previous sample from the measuring cell 5. When the reset is completed, a "READY" light is illuminated.

FIGURE III shows the particle size distribution of a sample of an aqueous kaolin clay suspension as determined by our process and TAPPI Standard, T649 s.m. 54. The agreement is excellent. However, whereas the TAPPI procedure required 50 hours to reach the 1 micron point, our process required only 20 minutes. Moreover, the curve could be continued to below 0.3 micron in a reasonable time.

FIGURE V shows a particle size distribution run on our apparatus of an aqueous suspension of a narrow size distribution kaolin clay fraction (between 1 and 4 microns Stokes' diameter). This curve illustrates the value of a continuously recorded particle size curve. Conventional techniques in which the data are obtained in a point by point fashion could miss the steeply sloping region shown in FIGURE V.

In a second embodiment employing a double beam apparatus in contrast to the single beam apparatus in FIGURE I, a second X-ray detector 27 and dummy or reference cell 26 are added to the apparatus of FIGURE I as shown in FIGURE IV. In this embodiment, the intensity of a portion of the X-ray beam that does not pass through the sample cell passes through cell 26 and is measured continuously, through detector 27 and then converted to a quantity proportional to the logarithm of the intensity. The difference between this reference signal and that obtained from the X-ray beam passing through the sample cell is always proportional to the concentration of particles in the sample cell beam, even though the output of the X-ray source should change. In substance, this is but another way of maintaining the constancy of the X-ray intensity incident on the sample cell 5. While with the single beam mode of operation the required constancy can be obtained by good regulation of the electrical current and voltage supplied to the X-ray tube, the use of the dummy cell provides an alternative.

The process and apparatus of our invention are applicable to all finely divided materials that can be brought into suspension in a deflocculated state and that will then undergo sedimentation according to Stokes' Law in response to gravitational forces. For solids of normal density, the particle size limits would correspond roughly to the range 1 mm. (1000 microns) to $1 \times 10^{-4}$ mm. (0.1 micron). Sedimentation analysis of particle size is most generally applied to materials of subsieve size, i.e., below 325 mesh (ca. 50 microns), but large enough that the effects of Brownian motion may be neglected, i.e., greater than about 0.1 micron diameter. Materials of industrial and technical interest that are commonly encountered in this size range include metallic oxides, such as iron oxide, uranium oxide, magnesium oxide; powdered metals as used in metallurgical applications, such as powdered iron, nickel, copper, manganese, etc.; pigments such as clay, calcium carbonate, talc, aluminum oxide, titanium dioxide, zinc chromate, etc.; materials used as abrasives, such as silicon carbide, emery, etc.; solid lubricants such as graphite, molybdenum disulfide, boron nitride, etc.; plus many other classes of material, such as soils, dusts, and so on.

The finely divided material need not be a solid, but may be an emulsion. The process and apparatus of this invention only require (1) that the disperse phase undergo sedimentation (either rising or falling) and (2) that the X-ray transmission of the initial dilute suspension differ appreciably (at least about ±5%) from the pure suspending fluid for the X-ray wavelength used. For example, kerosene globules in a kerosene-in-water emulsion can be measured.

The suspension used should be dilute enough so that particle-particle interaction do not interfere appreciably with the free movement of individual particles in response to gravitational forces. In general, concentrations less than about 5% by volume are satisfactory, concentrations in the range of 1–3% by volume being commonly employed.

For brevity, various features have been illustrated and described in connection with a limited number of illustrative embodiments. It is intended that these features be used also in combination with features shown in other embodiments without departing from the spirit of the invention. For example the source of X-rays can be one of a variety of known arrangements, including certain radioactive materials. Also any of a variety of suitable known X-ray detectors may be employed together with a similar variety of log converters and $X$–$y$ recorders. Moreover, various electromechanical means may be used to achieve the purpose stated for the program controller.

The terms and expressions that have been employed in the specification are used as terms of description and not of limitation, and there is no intention, in the use of such terms and expressions of excluding any equivalents of the features shown and described or portions thereof, since it is recognized that various modifications are possible within the scope of the invention claimed.

What is claimed is:

1. A process for automatically and rapidly determining particle size distribution of finely divided particles in suspension in a liquid medium based on the application of Stokes' Law of sedimentation, comprising continuously determining the concentration of particles at continuously decreasing sedimentation distances by means of continuously measuring the transmittance of X-rays through the suspension, continuously converting this transmittance measurement to a quantity proportional to the concentration of suspended material in the X-ray beam at a particular instant, and continuously recording the concentration on one ordinate of a graph with the other ordinate automatically positioned to indicate particle size at every instant.

2. A process according to claim 1 wherein the suspension of finely divided particles is an aqueous suspension of finely divided kaolin clay particles.

3. A process according to claim 1 wherein the suspension of finely divided particles is an aqueous suspension of a kaolin clay fraction of a narrow size distribution.

4. An automatic particle size analyzer comprising a sample chamber for holding a dilute suspension of finely divided material, means for generating an X-ray beam, means for directing an X-ray beam horizontally through the suspension, means for measuring the intensity of the X-ray beam horizontally transmitted through the suspension, electronic or electro mechanical means for converting this intensity measurement of X-ray beam transmittance to a quantity proportional to the logarithm of the intensity measurement, means for indicating said quantity as concentration, means for changing the vertical distance between the point of intersection of the X-ray beam with the suspension and upper or lower surface of the suspension according to whether the particles are more or less dense than the suspending fluid, and means for simultaneously providing an indication of the particle size corresponding to the elapsed sedimentation time and an instantaneous value of vertical distance according to Stokes' Law:

5. Apparatus according to claim 4 containing a means for compensating for any non-constancy of the X-ray radiation output.

References Cited

UNITED STATES PATENTS

| 2,817,970 | 12/1957 | Whitby | 73—432 |
| 3,084,591 | 4/1963 | Stevens | 88—14 |

RALPH G. NILSON, *Primary Examiner.*

A. L. BIRCH, *Assistant Examiner.*

U.S. Cl. X.R.

73—432; 356—102

REEXAMINATION CERTIFICATE (22th)

United States Patent [19]
Olivier et al.

[11] B1 3,449,567
[45] Certificate Issued   Oct. 5, 1982

[54] APPARATUS AND PROCESS FOR DETERMINING PARTICLE SIZE BY X-RAY ABSORPTION ANALYSIS

[75] Inventors: James Peter Olivier; George K. Hickin, both of Macon, Ga.

[73] Assignee: Freeport Minerals Company, New York, N.Y.

Reexamination Request
No. 90/000,065, Sep. 8, 1981

Reexamination Certificate:
Patent No.: 3,449,567
Issued: Jun. 10, 1969
Appl. No: 610,841
Filed: Jan. 23, 1967

[51] Int. Cl.³ .............................. G01T 1/20
[52] U.S. Cl. ...250/362; 73/432PS; 250/357; 250/359; 250/362; 250/363R; 250/383; 250/432R; 250/435
[58] Field of Search ......... 250/359, 432R, 434, 435; 73/432PS; 356/441, 335

[56] References Cited

U.S. PATENT DOCUMENTS
3,315,066   4/1967   Muta et al. ............... 235/151.3

FOREIGN PATENT DOCUMENTS
1500330   9/1967   France.
6408043   1/1966   Netherlands.
1081749   10/1967   United Kingdom.
1158338   7/1969   United Kingdom.

OTHER PUBLICATIONS

Talvite and Paulus "Recording, Photometric Particle-Size Analyzer"; "Review of Scientific Instruments" Magazine, vol. 27, No. 9; September 1956, pp. 763–767.

Bernstein, "A Reference Wedge X-Ray Gage", "Nondestructive Testing" magazine July-August 1958, pp. 305–312.

Michel and Rich, "X-Ray Photometer", "General Electric Review" magazine, February, 1947, pp. 45–48.

Childs, J., "Principles of Numerical Control" pp. 1–19 (1965).

Wilson, F., Ed., "Numerical Control in Manufacturing", pp. 154–161 (1963).

Primary Examiner—Davis L. Willis
Attorney, Agent, or Firm—Ronald A. Schapira and Charles B. Smith

[57] ABSTRACT

An apparatus and process for measuring and automatically recording the particle size distribution of material in suspension, which is based on the application of Stokes' Law of sedimentation. A beam of X-rays is used to measure particle concentration in terms of the transmittance of the beam in the suspension relative to the suspending fluid. A programmed drive mechanism causes the distance between the point of intersection of the X-ray beam with the suspension and upper or lower surface of the suspension to be continuously changed with time.

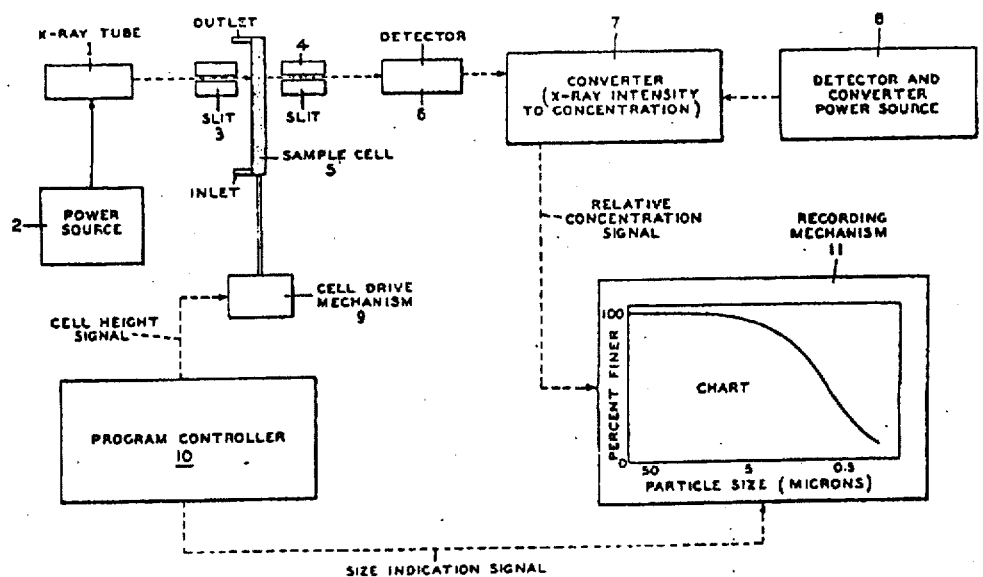

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

ONLY THOSE PARAGRAPHS OF THE SPECIFICATION AFFECTED BY AMENDMENT ARE PRINTED HEREIN.

Column 4, paragraph 3:

Sample cell 5 is driven downward via drive mechanism 9 relative to the X-ray beam, thus decreasing h. This motion is controlled as a function of time from the start of the run by program controller 10, that simultaneously positions the [y] *x* axis of the recorder 11 to directly indicate the particle size, $D_1$, corresponding through Stokes' Law, to the instantaneous values of $h_1$ and $t_1$.

AS A RESULT OF REEXAMINATION, IT HAS BEEN DETERMINED THAT:

The patentability of claims 2, 3 and 5 is confirmed.

Claims 1 and 4 are determined to be patentable as amended:

1. A process for automatically and rapidly determining particle size distribution of finely divided particles in suspension in a liquid medium based on the application of Stokes' Law of sedimentation, comprising continuously determining the concentration of particles at continuously decreasing sedimentation distances by means of continuously measuring the transmittance of X-rays through the suspension, continuously converting this transmittance measurement to a quantity proportional to the concentration of suspended material in the X-ray beam at a particular instant, and continuously recording the concentration on one ordinate of a graph [with] *and continuously recording particle size on* the other ordinate; *the location on said other ordinate, being recorded,* automatically [positioned] *moving with decreasing sedimentation distance at every instant* to indicate *simultaneously* particle size at every instant.

4. An automatic particle size analyzer comprising a sample chamber for holding a dilute suspension of finely divided material, means for generating an X-ray beam, means for directing an X-ray beam horizontally through the suspension, means for measuring the intensity of the X-ray beam horizontally transmitted through the suspension, electronic or electro mechanical means for converting this intensity measurement of X-ray beam transmittance to a quantity proportional to the logarithm of the intensity measurement, means for indicating said quantity as concentration, means for changing the vertical distance between the point of intersection of the X-ray beam with the suspension and *the* upper or lower surface of the suspension according to whether the particles are more or less dense than the suspending fluid, and means, *automatically moving with changes in the vertical distance,* for simultaneously providing an indication of the particle size corresponding to the elapsed sedimentation time and [an] *the* instantaneous value of *the* vertical distance according to Stokes' Law.

* * * * *